Patented Aug. 25, 1925.

1,550,749

UNITED STATES PATENT OFFICE.

LINCOLN M. SHAFER, OF IRVINGTON, NEW JERSEY, ASSIGNOR TO LOWER MANUFACTURING COMPANY, INC., OF NEWARK, NEW JERSEY, A CORPORATION OF NEW YORK.

PROCESS OF PRODUCING A DYESTUFF INTERMEDIATE.

No Drawing. Application filed March 12, 1925. Serial No. 15,134.

*To all whom it may concern:*

Be it known that I, LINCOLN M. SHAFER, a citizen of the United States of America, residing at Irvington, Essex County, and State of New Jersey, have invented certain new and useful Improvements in Processes of Producing a Dyestuff Intermediate, of which the following is a specification.

My invention comprises a new process for the monoalkylation of meta toluene diamine in the 4 positions ($CH_3$ in position 1).

It is known that when meta toluene diamine is alkylated by any of the ordinary alkylating agents such as methyl or ethyl alcohol and hydrochloric acid under pressure, or ethyl halide and caustic soda, a mixture of mono and dialkyl diamine is obtained. Isomeric mono alkyl diamines are also obtained.

George F. Taubert, Bulletin de la Societe Chimique de Paris, 3rd series, Vol. 21, page 20, sets forth a process by which 4 mono alkyl meta toluene diamine is obtained by alkylating orthonitro para toluidine and then reducing the nitro group to an amido group.

If acid binding materials are present during the alkylation, alkylation is obtained both in positions 2 and 4 and also the formation of dialkyl amido compounds. This is objectionable, because a mixture of isomeric compounds is obtained which cannot readily be separated in a practicable or commercial manner.

In my invention, by the process which I have discovered, acid binding materials are eliminated so that I obtain my alkylation in the 4 position and not in position 2. I have found that when dialkyl sulfate is allowed to react with meta toluene diamine under the conditions set forth in the examples hereinafter set forth, that only one alkyl group enters the amido group in the 4 position. 1 molecule of dialkyl sulfate is allowed to react with 1 molecule of meta toluene diamine at slightly elevated temperature without the addition of any acid binding substances, such as soda ash or caustic soda.

It will be understood that the conditions outlined in the following examples may be varied considerably as to temperature and concentration without appreciably affecting the result and that my invention is not limited strictly to these examples.

*Example 1.*

|  | Per cent. | Parts. |
|---|---|---|
| Meta toluene diamine | (99) | 122 |
| Water |  | 70 |
| Diethyl sulfate | (95) | 161 |

Heat mixture of meta toluene diamine and water to 60° C. Slowly add diethyl sulfate keeping temperature at 55–65° C. After stirring for two hours at this temperature submerge in about 2000 parts of water, neutralize with caustic soda, separate supernatant oil and distill under vacuum at 176 mm. pressure. The 4 mono ethyl meta toluene diamine boils at 220–227° uncorrected.

*Example 2.*

|  | Per cent. | Parts. |
|---|---|---|
| Meta toluene diamine | (99) | 122 |
| Toluol |  | 60 |
| Diethyl sulfate | (95) | 161 |

Heat mixture of meta toluene diamine and toluol to 60° C. and slowly add diethyl sulfate keeping temperature 60–70°. Stir three hours, submerge and neutralize, then steam off the excess toluol and separate off the supernatant layer of 4 mono ethyl meta toluene diamine.

*Example 3.*

|  | Per cent. | Parts. |
|---|---|---|
| Meta toluene diamine | (99) | 122 |
| Toluol |  | 80 |
| Dimethyl sulfate |  | 130 |

Heat mixture of meta toluene diamine and toluol to 70° C. and slowly add dimethyl sulfate keeping temperature between 70–75° C. Submerge and neutralize, then steam off the excess toluol, and separate the supernatant layer of 4 mono methyl meta toluene diamine.

By the process set forth in the above named examples 4 mono methyl meta toluene diamine is obtained in the form of an oil which becomes solid on cooling.

I claim:—

1. Mono-alkylation of meta toluene diamine by warming with dialkyl sulfate without the addition of an acid binding material.

2. The process of obtaining 4 mono ethyl meta toluene diamine by heating meta toluene diamine and water, adding diethyl sulfate, neutralizing with caustic soda, separating the supernatant oil and distilling under vacuum at about 176 mm.

3. The process of producing 4 mono ethyl meta toluene diamine by heating a mixture of meta toluene diamine to about 60° C. and slowly adding diethyl sulfate, submerging in water and neutralizing the mixture, steaming off the excess toluol and separating the supernatant layer of 4 mono ethyl meta toluene diamine.

LINCOLN M. SHAFER.